Patented July 26, 1938

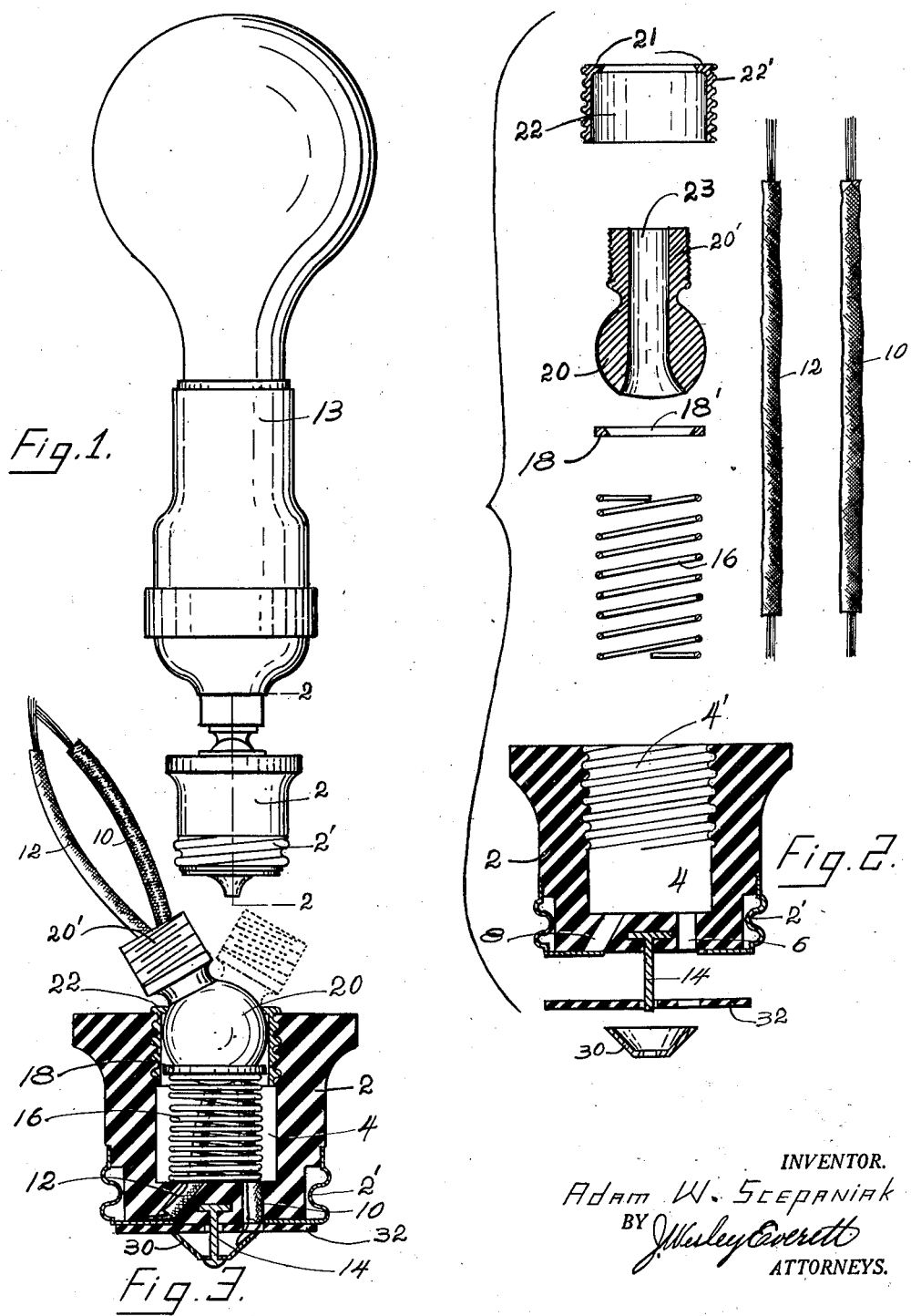

2,125,053

UNITED STATES PATENT OFFICE 2,125,053

ELECTRIC CONNECTER

Adam W. Scepaniak, Baltimore, Md., assignor of one-half to Martin Dorman, Baltimore, Md.

Application May 15, 1937, Serial No. 142,908

1 Claim. (Cl. 173—324)

The present invention relates to electric connecters and particularly to electric plug connecters which are adapted to screw within an electric light socket.

The ordinary plug connecter of this character is usually provided with a rigid threaded portion upon which a lamp socket may be supported. This method of attaching the socket to the connecter does not allow for adjustment of the lamp. One of the objects of the present invention is to provide a screw plug connecter with means for attaching a lamp socket so that the lamp may be universally adjustable within certain limits.

Another object is to provide such a connecter that may be easily and cheaply manufactured so that it may be saleable within an attractive price range.

With the above and other objects in view as will hereinafter be apparent the several novel features of the invention in its preferred form will be more fully described in the accompanying drawing in which:

Figure 1 is a view in side elevation of the plug showing the lamp socket and lamp attached.

Figure 2 is an enlarged vertical sectional view of the several parts taken along the line 2—2 of Figure 1.

Figure 3 is a view of the assembled connecter, partly in section and partly in elevation.

Referring to the drawing, 2 designates the body of the connecter, which is generally made of some non-conductive material, such as "Bakelite", or the like and having a screw thread 2' of conductive material on its lower end. The interior of the connecter is provided with an opening, or well 4, the upper portion of which is provided with an internal thread 4'. Extending downwardly from the bottom of the well 4 to the bottom of the connecter body are small openings 6 and 8, through which small electric cables 10 and 12 may pass for connecting the electric circuit to the lamp socket 13. The plug body is also provided with a metal pin 14, which is secured adjacent the bottom and extending downwardly for fastening one of the contact members to the plug.

The well 4 is constructed to receive a compression spring member 16, a washer 18, a ball joint 20 and a retaining member 22.

The ball joint 20, is provided with an external threaded portion 20' and an opening 23 extending through the ball 20 and the extended portion 20' to allow the cables 10 and 12 to be extended therethrough to the lamp socket 13. The washer 18 is adapted to act as a seat for the ball joint and receive the pressure from the compression spring 16 when assembled.

In assembling the connecter, the spring 16 is first inserted within the well 4, the washer is then placed over the top of the spring, the ball joint is placed upon the washer and rests within the seat 18' over which is placed the retaining member 22.

The retaining member 22 is provided with an external thread 22' and a restricted portion 21, which will rest upon the upper curvature of the ball joint 20 as shown in Fig. 3. This retaining member 22 is threadably receivable within the upper threaded portion 4' of the plug body. The ball joint is forced downwardly against the spring 16 by screwing the retaining member 22 into the plug. By this arrangement the friction on the ball joint may be adjusted to any desirable degree. Also the ball joint may be adjusted in any desirable position within certain limits, that is, until the extended portion 20' comes in contact with the retaining member 22.

As stated hereinbefore, the screw member 2' is constructed of metal, or of other conductive materials to form one of the contact members. The plug is also provided with a contact member 30 which is held in position by the pin 14. Between the contact member 2' and the contact member 30 there is provided an insulating washer 32.

Referring again to cables 10 and 12, the lower end of one is attached to the contact member 30 and the lower end of the other is attached to the contact member 2'. The cables extend upwardly through the plug and the ball joint and connect with the lamp socket 13.

The connecter is primarily for use with a special bulb now being sold on the market. This bulb has a portion of its surface covered with a paint like, metallic substance, which acts as a reflector and has become quite popular for lighting display windows. The objectional feature with this bulb, is the difficulty of adjusting the light of the bulb upon the various articles, wherein before in using the old style bulb and reflector, the reflector could be adjusted while the bulb remained stationary.

Although my improved connecter is designed for the above purpose, it is to be understood that its use is not limited thereto and that my invention is best defined in the appended claim.

I claim:

In combination, of an electric plug assembly, comprising a housing, one end of said housing being provided with a screw thread and adapted to be screwed into a lamp socket, the other end of said housing with a recess receiving a ball joint, means extending over said ball joint and receivable within the outer end of said housing for movably retaining said ball joint within the outer portion of said recess, a compressible spring member extending between said ball joint and the bottom of said recess for regulating the friction on said joint, means on said ball joint for rigidly securing thereto a lamp socket, means extending through said plug and ball joint for electrically connecting the lamp socket in which said plug is screwed to the lamp socket rigidly secured to the said ball joint.

ADAM W. SCEPANIAK.